United States Patent [19]

Furukawa et al.

[11] Patent Number: 4,483,547
[45] Date of Patent: Nov. 20, 1984

[54] STEERING DEVICE FOR VEHICLES

[75] Inventors: Yoshimi Furukawa, Saitama; Shoichi Sano, Tokyo, both of Japan

[73] Assignee: Honda Giken Kogyo Kabushiki Kaisha, Tokyo, Japan

[21] Appl. No.: 407,433

[22] Filed: Aug. 12, 1982

[30] Foreign Application Priority Data

Aug. 12, 1981 [JP] Japan .............................. 56-127189

[51] Int. Cl.³ .............................................. B62D 7/14
[52] U.S. Cl. ...................................... 280/91; 180/236
[58] Field of Search ............... 180/140, 234, 236, 240; 280/771, 91, 95 R, 95 A, 96, 98, 99, 103; 74/39, 40, 42, 43, 50, 89, 89.16, 89.2, 496, 498

[56] References Cited

U.S. PATENT DOCUMENTS

| 2,392,921 | 1/1946 | Holman .................................... 74/39 |
| 3,617,071 | 11/1971 | Ivancic .................................. 280/96 |
| 4,406,472 | 9/1983 | Furukawa ............................ 280/91 |

Primary Examiner—Joseph F. Peters, Jr.
Assistant Examiner—Ross Weaver
Attorney, Agent, or Firm—Irving M. Weiner; Pamela S. Burt; Anthony L. Cupoli

[57] ABSTRACT

A steering device for a vehicle provided with a steering wheel, front wheels and a front wheel steering mechanism, rear wheels and a rear wheel steering mechanism, a pair of rear wheel steering tie rods for respectively connecting the rear wheels to the rear wheel steering mechanism, and an operating shaft which connects the front and rear wheel steering mechanisms, the rear wheels being steered along with the front wheels in response to steering operation of the steering wheels. The rear wheel steering mechanism of the steering device comprises a plurality of rotary members operatively cooperating so as to rotate together, with the operating shaft being connected to the rotational center of one of the rotary members and the inner ends of the tie rods being connected to two of the rotary members at positions displaced from the rotational center, respectively. With such device, the rear wheels are rotated in the same direction as that of the front wheels under rotation of the rotary members during low steering angle operation of the steering wheel, and during large steering angle operation of the steering wheel the rear wheels are steered in a direction opposite to that of the front wheels or the steering angle of the rear wheels is reset to zero or near zero. The rear wheel steering mechanism is constructed so as to be very compact, and with high mechanical strength.

5 Claims, 8 Drawing Figures

STEERING DEVICE FOR VEHICLES

BACKGROUND OF THE INVENTION

1. Field of the Invention

The present invention relates to a steering device for a vehicle in which both the front wheels and the rear wheels are steered by the steering device.

2. Description of Relevant Art

U.S. Pat. No. 4,295,657, issued on Oct. 20, 1981 to the present applicants, discloses a vehicle steering device wherein the front wheels and the rear wheels are steered by steering operation of the steering wheel. The steering device is constructed such that the rear wheels are steered in the same direction as that of the front wheels when the steering wheel is rotated a small angular extent, such as generally occurs during high speed driving of the vehicle, and in turn the rear wheels are steered in an opposite direction to that of the front wheels or the steering angle of the rear wheels is returned to zero or near to zero when the steering wheel is rotated a relatively large angular extent during low speed driving of the vehicle. In this manner, a difference of time in producing laterally directed forces in the front and rear wheels is eliminated, non-coincidence between a longitudinal direction of the vehicle and a tangential direction of a turning orbit is eliminated and at the same time a steering characteristic during high speed driving is improved, and steering operation of the steering wheel during low speed driving of the vehicle is improved or facilitated to such a degree as to be similar to that provided by a conventional type of vehicle in which only the front wheels are steered.

On the other hand, means for steering the rear wheels is assembled in a vehicle body in the foregoing arrangement, so that the steering means is required to be made as compact as possible in positional relation to other means similarly assembled in the vehicle body and other equipment, etc. Further, the steering means is applied with a rear wheel steering force as a load, so that a high mechanical strength of the means is required.

The present invention provides an improved steering device for vehicles which effectively meets the above-mentioned requirements.

SUMMARY OF THE INVENTION

The present invention provides a steering device for a vehicle in which there is provided a steering wheel, right and left front wheels, front wheel steering means, right and left rear wheels, rear wheel steering means, a pair of right and left rear wheel steering tie rods for connecting the right and left rear wheels and the rear wheel steering means, and an operating shaft for connecting the front wheel steering means and the rear wheel steering means, the rear wheels being steered along with the front wheels during steering operation of the steering wheel. The rear wheel steering means comprises a plurality of rotary members operatively cooperating so as to rotate with each other, the operating shaft being operatively connected to the rotational center of one of the rotary members and the inner ends of the right and left tie rods being connected to two of the rotary members at positions displaced from the rotational center, respectively.

It is an object of the present invention to provide a vehicle steering device on which the rear wheels may be steered along with the front wheels during steering operation of the steering wheel, the rear wheels being steered in the same direction as that of the front wheels during low steering angle operation of the steering wheel and to the contrary during high steering angle operation, wherein the rear wheels are steered in an opposite direction to that of the front wheels or a steering angle of the rear wheels is set to be zero or near to zero. The rear wheel steering means is made compact so as to be capable of being installed in a space between other devices and equipment, etc., assembled in the vehicle body.

It is another object of the present invention to provide a vehicle steering device in which a rear wheel steering operation force transmitting path having a high strength against the rear wheel steering operation force as a load may be formed by increasing the mechanical strength of the rear wheel steering means.

The above and further objects, details and advantages of the present invention will become apparent from the following detailed description of preferred embodiments, when read in conjunction with the accompanying drawings.

DETAILED DESCRIPTION OF PREFERRED EMBODIMENTS

Figure 1:
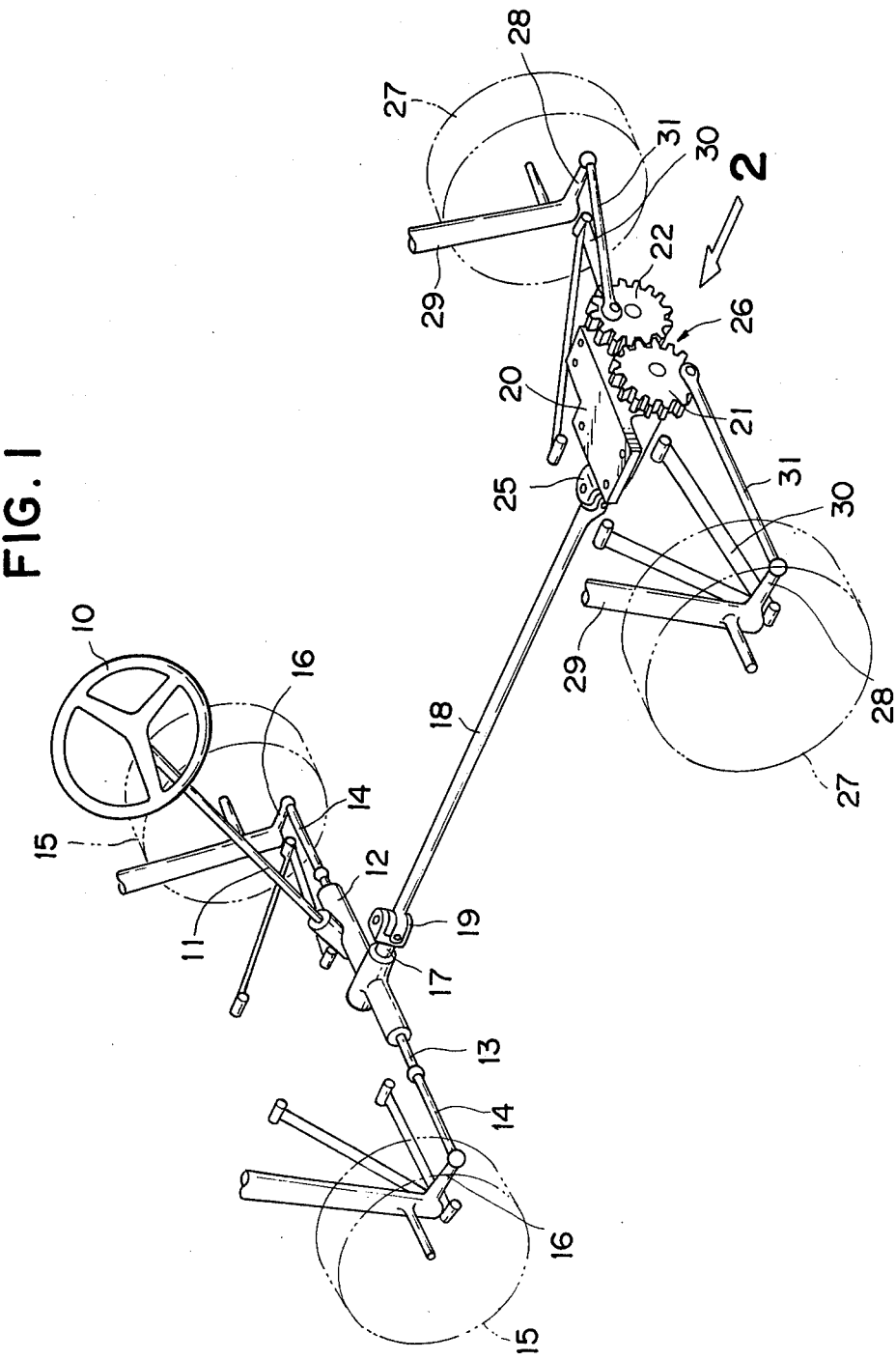
FIG. 1 is a perspective view showing schematically the fundamental structure of a vehicle provided with a steering device in accordance with a first preferred embodiment of the present invention.

With reference to FIG. 1, a steering shaft 11 of a steering wheel 10 to be operated by a driver is connected to a vehicle direction changing means installed in a gear box 12. Steering rotation of the steering wheel 10 is transformed to a movement of right and left front wheel steering tie rods 14, 14 in the width or transverse direction of the vehicle body through connecting rods 13 by direction changing means comprising, for example, a rack and pinion system. Outer ends of the tie rods 14, 14 support the front wheels 15, 15 and are connected to knuckle arms 16, 16 which may be steered in a rightward or a leftward direction. The front wheels 15, 15 are steered under the movement of tie rods 14, 14 toward a steering direction of the steering wheel 10.

The above-described arrangement of the front wheel steering means is substantially the same as that of a conventional system, and steering operation of the steering wheel 10 is aided by an arrangement of a power steering device installed in the gear box 12.

A connecting shaft 17 is connected to the internal mechanism in the gear box 12 through operating force transmitting means such as a rack and pinion, bevel gear and worm gear, etc., and also connected to the connecting shaft 17 is a front end of an operating shaft 18 through a universal joint 19. The operating shaft 18 extends in substantially a longitudinal direction of the vehicle body and a rear end of operating shaft 18 extends to a bracket 20 connected to the vehicle body. At the rear end surface of the bracket 20 are arranged two rotary members, i.e., gears 21 and 22, in a rightward or leftward direction, i.e., a vehicle width or transverse direction, the gears 21 and 22 having the same diameter and being engaged with each other. Therefore, both gears 21 and 22 are cooperatively rotated with their rotational angle ratio being 1 : 1.

Figure 2:
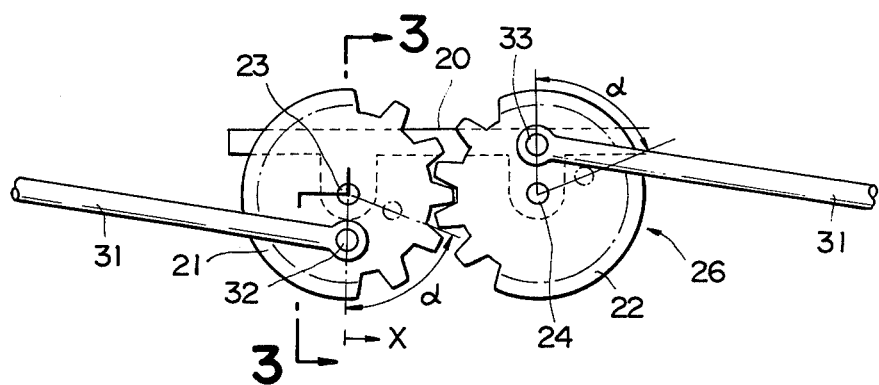
FIG. 2 is a view taken along arrow 2 in FIG. 1.
Figure 3:
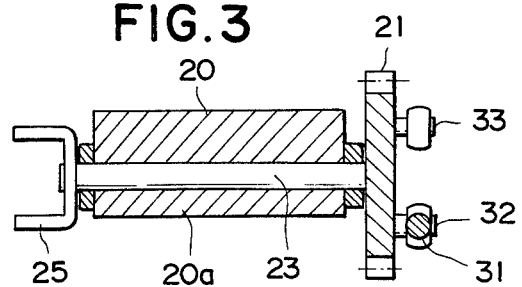
FIG. 3 is a sectional view taken along line 3—3 of FIG. 2.
Figure 4:
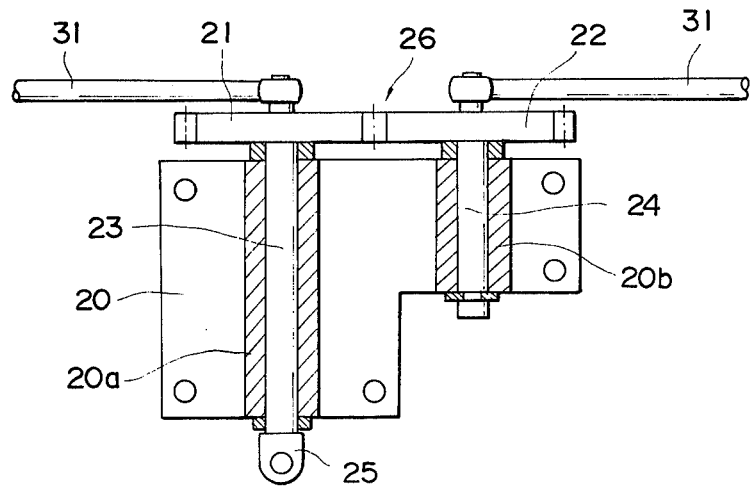
FIG. 4 is a partial bottom view in section.

As shown in FIG. 2, connected to the rotational centers of the gears 21 and 22 are shafts 23 and 24, and thus both gear shafts 23 and 24 which are parallel with each other in a vehicle width or transverse direction, with the longitudinal direction of the vehicle being the axial direction thereof, are rotatably supported in the bearings 20a and 20b of the bracket 20 as shown in FIG. 4, and a rear end of the operating shaft 18 is connected to the shaft 23 through a universal joint 25. When the steering wheel 10 is rotated, the operating shaft 18 is rotated through an internal mechanism in the gear box 12 and the connecting shaft 17, so that the shaft 23 is also rotated along with the steering wheel 10, and the gears 21 and 22 are rotated in a synchronized relation.

Rear wheel steering means 26 of a gear mechanism type comprises the gears 21, 22 and the shafts 23, 24, and a steering force applied to the steering wheel 10 is applied to the rear wheel steering means 26 from the shaft 23 such that the shaft 23 operates as an input shaft. The gear 21 to which the shaft 23 is connected comprises a driving gear and the other gear 22 comprises a driven gear. Because the rear wheel steering means 26 is constructed of a small number of component parts, it is formed as a compact unit. Further, a rear wheel steering force is transmitted to the rear wheel 27 through engagement of the gears 21 and 22, resulting in a high mechanical strength of the rear wheel steering means 26 against the rear wheel steering force as a load.

Each of the right and left rear wheels 27, 27 shown in FIG. 1 is supported by a knuckle arm 28 which may be steered in a rightward or leftward direction. The knuckle arm 28 is suspended by a rear wheel suspension mechanism comprised of a shock absorber 29 having the top end thereof connected to the vehicle body, and a lower arm 30 having the inner end thereof pivotally attached to the vehicle body in such a way as to permit swinging thereof in a vertical direction. To the right and left knuckle arms 28 and 28 are connected outer ends of the rear wheel steering tie rods 31, 31 which are extended in a vehicle width or transverse direction. The rear wheels 27 are steered under a rightward or leftward pivoting movement of the knuckle arms 28 caused by a rightward or leftward movement of the tie rods 31.

Inner ends of the right and left rear wheel steering tie rods 31, 31 are connected to the gears 21, 22 by pins 32, 33 which are diametrically displaced from a rotational center of the gears 21, 22, respectively. Both such connecting positions are symmetrical with respect to a rotational center of the gears 21, 22 and equally spaced apart from the rotational center. Thus, when the vehicle is moved in a straight forward direction, i.e., with the steering wheel 10 set at its neutral position, the pins 32 and 33 are, as shown in FIG. 2, positioned on a vertical line passing through the rotational centers of the gears 21, 22.

Although the tie rods 31, 31 are shown as being connected directly to the gears 21, 22 through the pins 32, 33, such connection may alternatively be made by another member or mechanism (not shown), provided that the connection is effected such that the rotational movements of the gears 21, 22 are transmitted to the tie rods 31, 31.

When the steering wheel 10 is rotated in a leftward direction, the front wheels 15 are steered in a leftward direction and at the same time the gear 21 is rotated in a leftward direction in FIG. 2, with the gear 22 being rotated in a rightward direction, and thereby the rear wheels 27 are steered through the tie rods 31. On the other hand, when the steering wheel 10 is rotated in a rightward direction, the steering direction of the front wheels 15 and the rotational directions of the gears 21, 22 are simply reversed, and their fundamental operations are not changed. When a power steering device is arranged in the gear box 12, the rear wheel steering operation is performed by auxiliary power obtained from the power steering device, and thus a rear wheel power steering device which is independent of the front wheel power steering device may be installed in a vehicle.

Figure 8:
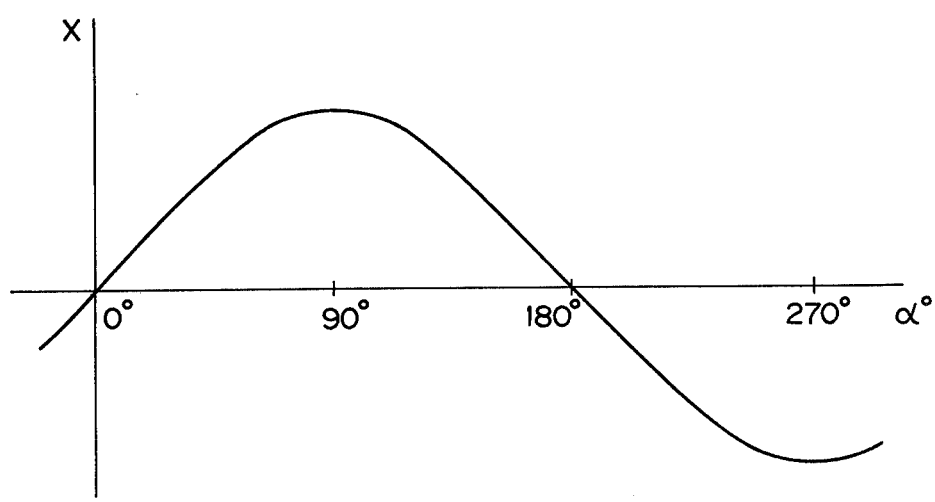
FIG. 8 is a graph showing a stroke of horizontal movement of a tie rod for steering the rear wheels with respect to a rotational angle of a rotary means.

As shown in FIG. 2, when the gears 21 and 22 are rotated by an angle of $\alpha°$, a horizontal movement stroke of the tie rods 31 is assumed to be x. FIG. 8 is a graph in which the X-axis represents $\alpha°$ and the Y-axis represents x. The value of x is a sine value of $\alpha°$ and has a maximum value when $\alpha°$ is 90°, with x being reset to zero when $\alpha°$ is 180°. On the other hand, when $\alpha°$ exceeds 180°, x becomes a reversed value of positive and negative values, and the values become a maximum value when $\alpha°$ is 270°. Therefore, when $\alpha°$ is an angle between 0° and 180°, the rear wheels 27 are steered in the same direction as that of the front wheels 15 and when $\alpha°$ is an angle between 180° and 360°, the rear wheels 27 are steered in a direction opposite to that of the front wheels 15.

In the foregoing description, the height component of a length of the tie rod 31 which may be varied as the gears 21, 22 are rotated is eliminated. The rotating radius of the connection part between the gears 21, 22 and the tie rods 31, 31 through the pins 32, 33 is extremely small compared to a length of the tie rod 31, and no problem arises even if a horizontal length component in the x-direction of the tie rod 31 is equal to a substantial length of the tie rod 31, so that no substantial difference in the foregoing description will arise.

A transmission mechanism such as a gear-type transmission mechanism is installed in a rear wheel steering force transmitting path starting from the steering wheel 10 to the gears 21, 22, a ratio of transmission in the transmission mechanism being properly set to have relative rotational angles of gears 21, 22 with respect to the rotational angle of the steering wheel 10. Thereby, under a small steering angle of the steering wheel 10, the front wheels 15 and the rear wheels 27 are steered in the same direction, and under a large steering angle of the steering wheel 10 the rear wheels 27 are steered in an opposite direction to that of the front wheels 15. Further, for a small steering angle of the steering wheel 10 the front wheels 15 and the rear wheels 27 may be steered in the same direction, and for a large steering angle of the steering wheel the steering angle of the rear wheels 27 may be set at zero or at a value near to zero.

The size of the steering angle of the rear wheels 27 is related to a distance between the rotational centers of the gears 21, 22 and the pins 32, 33, and this distance may be defined in response to a ratio of a rear wheel steering angle with respect to a front wheel steering angle which is preferable for the vehicle to which the present invention is applied.

Figure 5:
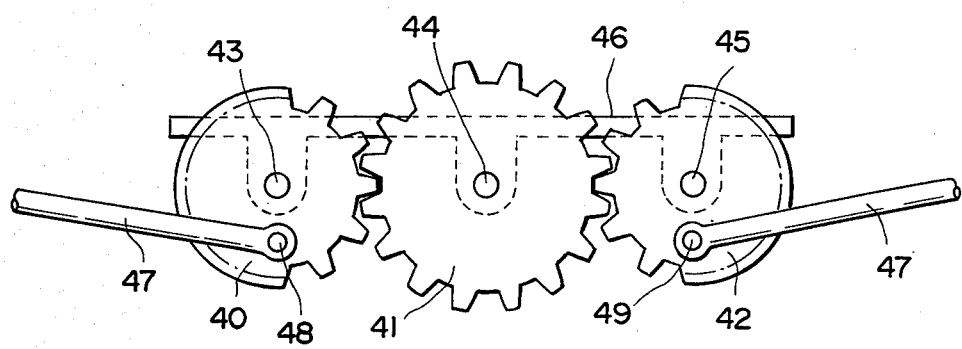
FIG. 5 is a view similar to FIG. 2 showing a device constructed in accordance with a second preferred embodiment of the present invention.
Figure 7:
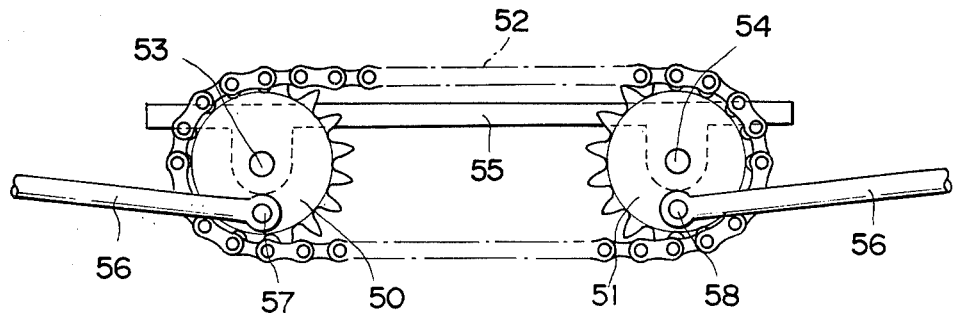
FIG. 7 is a view similar to FIG. 2, showing a device constructed in accordance with a third preferred embodiment of the present invention.

FIGS. 5 and 7 respectively illustrate second and third preferred embodiments of the present invention in which a rear wheel steering operation similar to that of the first preferred embodiment described hereinabove may be realized.

Figure 6:
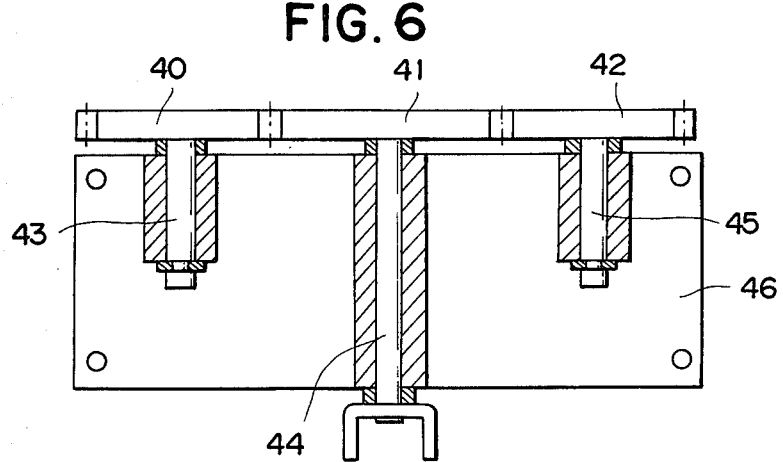
FIG. 6 is a partial bottom view in section of the structure shown in FIG. 5.

The second embodiment shown in FIGS. 5 and 6 is constructed such that a rotary body, similar to that of the first preferred embodiment, is comprised of gear means, the number of gears being three, i.e., gears 40, 41 and 42 which are arranged in a width or transverse direction of the vehicle body. Shafts 43, 44 and 45 connected to the rotational centers of the gears 40, 41 and 42, respectively are supported by a bracket 46 which is attached to the vehicle body. The central gear 41 comprises a driving gear, and thus the shaft 44 comprises an input shaft which is rotated in operative cooperation with the steering wheel. Auxiliary gears 40 and 42 having substantially the same diameter are engaged at both sides of the driving gear 41, and the right and left rear wheel steering tie rods 47, 47 are connected to the driven gears 40 and 42 by pins 48 and 49 at positions which are displaced from the rotational centers of the gears 40 and 42. Because the gears 40 and 42 are rotated in the same direction in synchronized relation, the connecting positions of the tie rods 47 and 47 are at the same position with respect to the rotational centers of the gears 40 and 42, i.e., just below the rotational centers in the example shown in FIG. 5.

In the third embodiment of the invention shown in FIG. 7, the rotary members comprise two sprockets 50 and 51 which are arranged in a vehicle width or transverse direction and the two sprockets 50 and 51 connected by a chain 52 are cooperatively rotated with each other. The shafts 53 and 54 connected to the rotational centers of the sprockets 50 and 51 are supported by a bracket 55 fixed to the vehicle body, and either one of the two shafts 53 and 54 comprises an input shaft which is cooperatively rotated with a steering wheel. The inner ends of the right and left rear wheel steering tie rods 56 and 56 are connected to the sprockets 50 and 51 by pins 57 and 58 at positions which are displaced from the rotational centers of the sprockets 50 and 51. The sprockets 50 and 51 are rotated in the same direction in synchronized relation, so that the connecting positions of the tie rods 56 and 56 remain the same with respect to the rotational centers of the sprockets 50 and 51.

In the embodiment shown in FIG. 7, the sprocket may comprise a pulley, and the chain may comprise a slipless belt or wire, an endless running belt, etc.

As will be understood from the foregoing description of the present invention, the rear wheel steering means may be constructed by the input shaft and at least two rotary members, i.e., a minimal number of component parts, so that the means may be made compact in a small-sized structure. Further, the present invention may be effectively installed in a vehicle body in which other equipment or devices are already assembled. The means for transmitting a rear wheel steering force in accordance with the invention comprises rotary members such as gears, etc., so that such means may be constructed with a high mechanical strength against the rear wheel steering operating force applied as a load.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A steering device for a vehicle including a steering wheel, right and left front wheels, front wheel steering means, right and left rear wheels, rear wheel steering means, a pair of right and left rear wheel steering tie rods for connecting said right and left rear wheels and said rear wheel steering means, and an operating shaft for connecting said front wheel steering means and said rear wheel steering means, said rear wheels being steered along with said front wheels under a steering operation of said steering wheel, wherein:

said rear wheel steering means comprises a plurality of rotary members operatively cooperating so as to rotate with each other;

said operating shaft is operatively connected to the rotational center of one of said rotary members;

the inner ends of said right and left tie rods are connected to two of said rotary members at connecting positions which are displaced from the rotational centers of said rotary members, respectively, said connecting positions being disposed on substantially vertical lines passing through said rotational centers of said rotary members when said steering wheel is set at a neutral position thereof; and whereby said rear wheels are rotated in the same direction as that of said front wheels under rotation of said rotary members during low steering angle operation of said steering wheel, and during large steering angle operation of said steering wheel said rear wheels are steered in a direction opposite to that of said front wheels or the steering angle of said rear wheels is reset to zero or near zero.

2. A steering device for a vehicle according to claim 1, wherein:

said rotary members comprise two gears which are operatively engaged with each other.

3. A steering device for a vehicle according to claim 1, wherein:

said rotary members comprise three gears;

said three gears are arranged such that two side gears are engaged with a central gear at both sides of said central gear;

said operating shaft is operatively connected to said central gear; and said right and left tie rods are connected to said two side gears, respectively.

4. A steering device for a vehicle according to claim 1, wherein:

said rotary members comprise two sprockets which are cooperatively rotated by a chain.

5. A steering device for a vehicle according to claim 1, wherein:

said rotary members comprise two pulleys which are cooperatively rotated by an endless running belt.

* * * * *